United States Patent [19]

Karunasiri et al.

[11] Patent Number: 5,703,464
[45] Date of Patent: Dec. 30, 1997

[54] RADIO FREQUENCY ENERGY MANAGEMENT SYSTEM

[75] Inventors: Tissa R. Karunasiri, Van Nuys; David A. Bell, Altadena; Bruce M. Ryan, West Hills, all of Calif.

[73] Assignee: Amerigon, Inc., Irwindale, Calif.

[21] Appl. No.: 495,984

[22] Filed: Jun. 28, 1995

[51] Int. Cl.$^6$ ................................ H01M 10/44
[52] U.S. Cl. ................... 320/19; 310/15; 310/51
[58] Field of Search ................. 320/2, 5, 15, 16, 320/17, 18, 19, 48; 310/59, 220; 363/46, 47

[56] References Cited

U.S. PATENT DOCUMENTS

| | | | |
|---|---|---|---|
| 4,833,459 | 5/1989 | Geuer et al. | 340/636 |
| 5,003,456 | 3/1991 | Forge | 363/89 |
| 5,150,031 | 9/1992 | James et al. | 320/2 |
| 5,195,813 | 3/1993 | Brown | 362/61 |
| 5,200,688 | 4/1993 | Patino et al. | 320/13 |
| 5,206,097 | 4/1993 | Burns et al. | 429/90 |
| 5,248,929 | 9/1993 | Burke | 320/48 |
| 5,302,902 | 4/1994 | Groehl | 324/434 |
| 5,309,052 | 5/1994 | Kim | 310/51 |
| 5,319,298 | 6/1994 | Wanzong et al. | 320/22 |
| 5,325,040 | 6/1994 | Bogut et al. | 320/22 |
| 5,341,083 | 8/1994 | Klontz et al. | 320/2 |
| 5,349,282 | 9/1994 | McClure | 320/22 |
| 5,349,535 | 9/1994 | Gupta | 364/483 |
| 5,363,031 | 11/1994 | Miller et al. | 320/21 |
| 5,376,922 | 12/1994 | Kiss | 340/552 |
| 5,382,948 | 1/1995 | Richmond | 340/825 |
| 5,387,857 | 2/1995 | Honda et al. | 320/18 |
| 5,469,042 | 11/1995 | Ruhling | 320/17 |
| 5,475,366 | 12/1995 | Van Lente et al. | 340/525 |
| 5,481,257 | 1/1996 | Brubaker et al. | 340/825.69 |
| 5,488,282 | 1/1996 | Hayden et al. | 320/14 |
| 5,534,845 | 7/1996 | Issa et al. | 340/425.5 |
| 5,539,297 | 7/1996 | Fiebig | 320/15 |

*Primary Examiner*—Peter S. Wong
*Assistant Examiner*—Gregory J. Toatley, Jr.
*Attorney, Agent, or Firm*—Christie,Parker & Hale LLP

[57] ABSTRACT

A radio frequency energy management system includes a number of battery control modules and an control unit, each configured to transmit and receive radio frequency signals comprising information relating to the operating parameters of batteries in a battery pack, and control commands for regulating the operating parameters of such batteries. Each battery control module is configured to monitor one or more operating parameter of a respective battery, and to regulate one or more operating parameter according to a control system program in the control unit. Each battery control module includes one or more sensing elements to measure one or more operating parameter of a respective battery, a radio frequency receiver, and a radio frequency transmitter. The control unit is configured to monitor and control the operating parameters of the batteries and includes a radio frequency receiver, configured to receive a radio frequency signal transmitted by the radio frequency transmitter in each battery control module, and a radio frequency transmitter configured to transmit a radio frequency signal capable of being received by the radio frequency receiver in each battery control module. The control unit evaluates data transmitted from each battery control module according to a predetermined control system program, and transmits a predetermined control command to one or more battery control module to achieve battery equalization. Radio frequency signals are transmitted between the control unit and each battery control module without additional wiring, thereby eliminating the disadvantages of wired-type systems.

44 Claims, 3 Drawing Sheets

RADIO FREQUENCY ENERGY MANAGEMENT SYSTEM

FIELD OF THE INVENTION

This invention relates to energy management systems for monitoring and controlling electrical power sources and, more particularly, to an energy management system for monitoring and controlling electric batteries or battery cells in a battery pack used to power electric vehicles by use of radio frequency data and control signal transmission.

BACKGROUND OF THE INVENTION

Energy management systems for monitoring and controlling the operation of electrical devices in conventional hydrocarbon powered vehicles are known in the art. Such systems may include one or more device located near the particular electrical device to be monitored and controlled. These devices perform the desired monitoring or control functions in response to control signals provided by a central control unit or "brain". The central control unit is typically mounted at a location within the vehicle remote from the devices and is electrically connected to the device by a wiring harness. The control unit may include a processing system that processes any input signals received from the devices and transmits output signals to the devices to perform a specific control function. The processing system may be driven according to a specific control system program.

In conventional hydrocarbon powered vehicles, energy management is an ancillary feature that allows the vehicle's electrical functions, such as heating and cooling of the passenger compartment, to be performed in a more efficient or more comfortable manner. Such an energy management system may also operate to optimize the operation of the engine under particular conditions to improve engine efficiency or performance.

However, in electrically powered vehicles, energy management is not an ancillary feature but is a primary feature that is useful in monitoring and controlling the performance of the power source itself. In order to obtain maximum operating efficiency of an electrically powered vehicle, it is desired that the particular electric power source be controlled in such a manner to derive its maximum output capacity under a variety of different operating conditions. Accordingly, it is desired that energy management systems useful in electric powered vehicles, rather than monitor and control accessory electrical functions such as passenger compartment cooling and heating, operate primarily to monitor and control operating parameters of the power source itself, e.g., battery or battery cell voltage.

Energy management systems that are used with electrically powered vehicles to monitor and control the electric batteries, or individual cells in the batteries, used to power an electric vehicle, are known in the art. Such energy control systems are similar to those discussed above for use with hydrocarbon powered vehicles, in that such systems typically include one or more monitoring device and a central control unit. The monitoring devices are positioned near a particular battery or battery cell, and the central control unit is positioned within the vehicle at some remote location. Each monitoring device is connected to the central control unit by wired connection, typically by use of a wire harness, to facilitate transmission of information to and from the monitoring modules and the central control unit. The central control unit is configured to receive data from the monitoring devices, process the data, and produce control signals to the monitoring devices to effect a desired change in battery or battery cell operation.

In such systems, control signals are passed from the central control unit to a monitoring device, and information is passed from the monitoring devices to the central control unit through wires that run through the vehicle and connect each monitoring device with the central control unit. The wires can either be bundled together and routed along a primary wire harness for the vehicle's electrical system, or may routed separately from the primary wire harness.

A wire-type energy management system for monitoring and controlling operating parameters of an energy source in an electric powered vehicle is not desirable for a number of reasons. The use of wires, in addition to those already in the vehicle's electrical system, can add as much as fifty pounds to the weight of the vehicle. Such added weight can decrease the vehicle's acceleration and increase battery charge frequency. The use of a wire-type energy management system also increases the manufacturing cost of the vehicle, due both to the time associated with installing the additional wiring and the cost of the wire itself. The use of a wire-type energy management system also increases the cost of maintaining the system, because of the proximity of the wires connecting the monitoring devices to the batteries and resulting corrosion damage that is likely to occur. Such corrosion damage adversely effects the reliability and service life of a wire-type energy management system.

Additionally, the use of a wire-type energy management system requires use of high-voltage isolation components to reduce system interference or noise that may occur in signal wires from high-voltage wires that are typical of electric vehicle battery packs in the vehicle's electrical system. The use of such high-voltage isolation components both increases the manufacturing cost of the electric vehicle and increases vehicle weight. A wire-type energy management system is also limited in terms of future component upgrades, because of the need to provide additional wiring for each new upgraded component.

It is, therefore, desirable that an energy management system for use with an electric powered vehicle be constructed having multiple system devices capable of communicating with a central control unit in a wireless manner that does not add weight to the vehicle, is not vulnerable to battery corrosion, is easy and quick to install, does not require the use of high-voltage isolators, and that facilitates any upgrading or adding of new devices without modification. It is desirable that such an energy management system be configured having devices that are capable of being used to monitor and control one or more batteries or the battery cells of each such battery to provide battery equalization and, thereby optimize the performance of a battery pack comprising such batteries. Particularly, it is desirable that the energy management system be configured to permit the detection of battery or battery cell changes and to permit tracking individual battery characteristics.

SUMMARY OF THE INVENTION

There is, therefore, provided in the practice of this invention a wireless radio frequency energy management system for use in an electrically powered apparatus such as an electric vehicle having a battery source of motive power. The energy management system includes a number of battery control modules and a control unit. Each battery control module is configured to transmit radio frequency signals that carry information relating to the operating parameters of an electric power source, e.g., a battery pack, individual batteries in a battery pack, or battery cells in batteries making up a battery pack. The control unit is configured to receive such signals and transmit to the battery control modules control signals for regulating the operating parameters of such power source.

Each battery control module is configured to monitor one or more designated operating parameter(s) of the power source, and to control or regulate one or more operating parameter(s) according to a designated control signal received from the control unit. Each battery control module includes one or more monitoring or sensing element(s), each configured to measure a designated operating parameter of the power source. Each battery control module also includes a radio frequency receiver and a radio frequency transmitter. Each battery control module is configured to transmit battery operating parameter information to the control unit in response to a control signal.

The control unit is configured to monitor the operating parameter(s) of the power source measured by the sensing element(s) in each battery control module, and control the battery control modules to regulate such operating parameters. The control unit includes a radio frequency receiver configured to receive a radio frequency signal transmitted from the radio frequency transmitter in each battery control module. The control unit also includes a radio frequency transmitter configured to transmit a radio frequency control signal that is capable of being received by the radio frequency receiver in each battery control module.

The control unit evaluates data transmitted from each battery control module regarding the operating parameter(s) of the power source, evaluates the data according to a predetermined control system program, and generates a predetermined control command that is transmitted as a control signal to the battery control modules. The control unit addresses the control signal to be recognized by one or more designated battery control module. In the event that the power source monitored comprises individual batteries in a battery pack, the control Unit is programmed to evaluate the operating parameter(s) of the individual batteries and generate one or more control signal to effect battery charge equalization, thereby extending battery pack service life.

Radio frequency signals are transmitted between the control unit and each battery control module without the use of additional wiring, by using a main conductive path that runs between the batteries within a battery pack, through the battery pack, and to a power handling device of an existing electrical system. The main conductive path acts as a transmission medium for the radio frequency signal. By eliminating the need for additional wiring, wiring harnesses and the like to enable signal transmission, and by designing the energy management system as a modular construction, the resulting system is light weight, is not vulnerable to battery corrosion, is easy and quick to install, facilitates upgrading or adding of new modules without significant modification, facilitates easy switching or replacing of batteries or the entire battery pack, and does not require the use of high-voltage isolators when compared to existing wired-type systems.

BRIEF DESCRIPTION OF THE DRAWINGS

These and other features and advantages of the present invention will become appreciated as the same becomes better understood with reference to the specification, claims and drawings wherein:

DETAILED DESCRIPTION

An energy management system (EMS) constructed according to principles of this invention includes a control unit and a number of battery control modules. The system can be used for monitoring the performance of, measuring the operating parameters of, and controlling operating parameters of batteries, battery cells, or groups of batteries within a battery pack. The system of this invention can be used with battery packs for electrically powered devices such as electric vehicles and hybrid electric vehicles having a battery source of motive power (e.g., military vehicles, trains, wheelchairs, golf carts and other recreational vehicles, stackers, forklifts, industrial vehicles, buses, automobiles, and three wheel drive vehicles), in electrical power-storage applications (e.g., home emergency, business operation, boat, aircraft, or satellite power supplies), and in consumer electronic devices.

Figure 1:
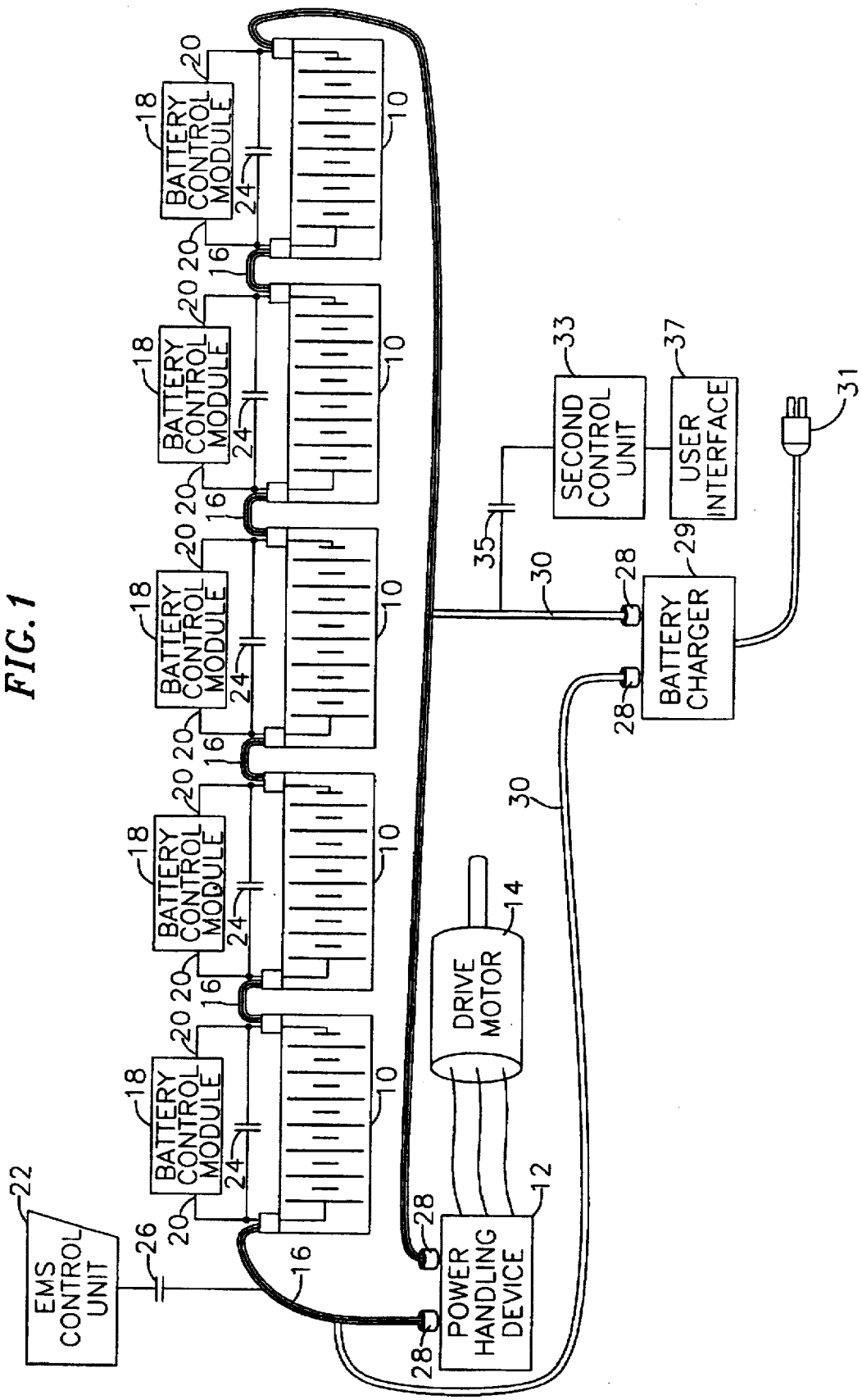
FIG. 1 is a schematic diagram of an energy management system constructed according to principles of this invention comprising a control unit and a number of battery monitoring modules.

Referring to FIG. 1, an EMS prepared according to this invention is illustrated as installed in an electrical system of an electrically power device. The electrical system includes a number of batteries 10 that are connected in series to form a battery pack. In the embodiment illustrated, the battery control modules are shown as being used with five batteries 10. For use in an electrical system of an electric vehicle, each battery 10 is a lead-acid battery having a voltage in the range of from about 10 to 15 volts DC. It is to be understood that EMSs of this invention are intended to be used with many different types of batteries, i.e., batteries having other than lead-acid construction, for example nickel-cadmium, silver-zinc, lithium polymer, zinc-air, sodium-sulfur and the like. It is also understood that EMSs of this invention can be used with batteries configured differently within a battery pack, i.e., batteries connected in series, series/parallel, or parallel, than that specifically described and illustrated in FIG. 1. In addition, EMSs of this invention can be used with battery packs made up of identical type of batteries, or battery packs made up of combinations of different types of batteries, e.g., lead-acid and nickel-cadmium batteries, lead-acid and zinc-air batteries, lithium polymer and lead-acid batteries, zinc-air and nickel-cadmium batteries.

The electrical system of the apparatus also includes a power handling device 12. In an electric vehicle, the power handling device is a motor controller 12, which can be a conventional motor controller used to control the amount and polarity of voltage that is applied to one or more drive motor 14 used to turn a corresponding vehicle axle or wheel.

The electrical system of the apparatus includes a main conductive path or main conductor 16 formed from an assembly of one or more electrically conductive wires that is used to electrically connect together the batteries 10, to form a battery pack, and connect the battery pack with other primary electrical devices in the device. In an electrically power vehicle, the main conductor 16 is used to connect the batteries 10 in series connection to form the battery pack, and is used to electrically connect the battery pack to the motor controller 12. Accordingly, in an electric vehicle power from the battery pack is routed via the main conductor 16 to the motor controller 12 for application to one or more drive motor 14.

An EMS constructed according to principles of this invention includes a number of battery control modules (BCM) 18 that are each configured to measure one or more power source operating parameter(s). As applied in a primary electrical system in an electric vehicle, each BCM can be used to monitor one or more operating parameter(s) of a battery pack, batteries in the battery pack, or battery cells in a battery making up the battery pack. As installed in an electric vehicle, each BCM is powered by 12 volts DC, supplied by connection between BCM power leads 20 and respective positive and negative terminals of an associated battery 10. Alternatively, rather than being powered by a respective battery, each BCM can be powered by an internal power source, by a power source on the vehicle other than a respective battery, by inductive transmission of AC power, by solar power and the like.

Each BCM 18 of the embodiment of FIG. 1 is configured to monitor one or more operating parameter(s) of a respective battery 10 in the battery pack. Accordingly, the number of BCMs used in the EMS shown in FIG. 1 is the same as the number of batteries 10 that are used to make up the battery pack, i.e., five. Alternatively, the BCMs can be used to monitor one or more operating parameter of each battery cell in the batteries that make up the battery pack, in which case the number of BCMs used could be greater than the number of batteries. It is, therefore, to be understood that the BCMs can be used in a manner other than that specifically described above and illustrated in FIG. 1.

Additionally, although each BCM 18 is illustrated as being separate from each respective battery, it is to be understood that each BCM could alternatively be constructed as part of the battery itself or as an integral element of the battery. For example, the BCM could be manufactured within a compartment in the battery housing, isolated from the electrolytic cells. In such an embodiment, all outputs from and inputs to the BCM would be connected to respective battery terminals or other battery inputs or outputs internally within the battery housing. Alternatively, the BCMs are configured to be releasibly attachable to a respective battery used in a battery pack to facilitate both removal, when a battery is removed from the battery pack, and attachment when the removed battery is replaced with a new battery. Additionally, where each BCM is configured to monitor the operating parameters of individual battery cells, the BCMs are configured to be releasibly attached to a respective battery cell.

Each BCM 18 is constructed to monitor and measure one or more designated operating parameter(s) of a respective battery 10. The particular operating parameter(s) monitored and measured by each BCM can vary, depending on each particular application, but may include battery voltage, battery current, battery cell electrolyte density or specific gravity, specific gravity gradient, electrolyte level, battery temperature, battery pressure, and combinations thereof. In one embodiment, each BCM 18 is constructed to monitor the voltage output and temperature of each respective battery. Each BCM is configured to transmit operating parameter information to the control unit in response to a control signal. Each BCM 18 is also constructed to control designated operating parameters of a respective battery such as battery voltage, resistance, temperature, current and the like, in response to a control signal. In one embodiment, each BCM is constructed control the voltage, current, or effective resistance of a respective battery within the battery pack.

A key feature of each BCM is that it is constructed to transmit information relating to one or more monitored or measured battery operating parameter using a radio frequency signal rather than by conventional transmission means, such as by using electrically conductive wires. Each BCM is constructed to receive an analog input signal from one or more monitoring element or sensor for a respective battery, convert the analog signal to a digital signal, and transmit the signal using a designated radio frequency to an EMS control unit 22, described in greater detail below. To facilitate transmission of the radio frequency signal within the vehicle, the main conductor 16 serves as a transmission medium and radio frequency inputs and outputs of each BCM 18 and the control unit 22 are connected thereto. The main conductor 16 acts as a transmission medium to transmit the radio frequency signal from each BCM to the EMS control unit without the need to add additional wiring.

An EMS constructed according to principles of this invention includes an EMS control unit 22 that comprises a signal conductor connected to the main conductor 16 for purpose of receiving and transmitting radio frequency signals to and from each BCM 18. The control unit 22 is located on board the device or vehicle. The location of the control unit may depend on a number of different variables such as available room, battery pack type and the like. In certain embodiments, the control unit 22 can be manufactured as part of a power handling device or motor controller 12. The control unit 22 is constructed to receive battery operating parameter information from one or more designated BCM, process the information according to a predetermined control system program, and transmit monitoring, measuring and/or control instructions to one or more designated BCM 18.

A key feature of the control unit 22 is that, like the BCMs 18, it is constructed to receive radio frequency signals transmitted by each of the BCMs 18 through the main conductor 16. The control unit 22 is constructed to take the input radio frequency signal from each BCM and convert it to a digital signal. The digital signal is then sent through a processor, which evaluates the digital signal according to a control system program and provides a digital output control signal. The control unit 22 is constructed to take the digital output signal, convert it to a radio frequency signal, and transmit the radio frequency signal to one or more designated BCM 18.

To permit communication between the control unit 22 and one or more designated BCM 18, the control module includes means for encoding or addressing each output control signal to be recognized by one or more designated BCM 18. Each BCM is also constructed having complementary means for reading the control signal to determine whether the control signal is addressed to that particular BCM. Constructed in this manner, the control unit 22 is able to transmit control signals to particular BCMs in response to information received from such BCM. Additionally, in alternative embodiments, each BCM is configured to recognize more than one addressed control signal, which may also be recognized by more than one BCM, to permit the control unit to control more than one BCM simultaneously. This is desirable under certain operating conditions, such when the energy source or battery pack is cold and it is desired that a number of BCMs be controlled to heat a number of batteries in the battery pack and, thereby provide enhanced performance.

Referring still to FIG. 1, an EMS constructed according to principles of this invention includes means for insuring that radio frequency signals between the control unit and each BCM are not interrupted or disconnected in the event of an open circuit across a battery. In one embodiment, such means is a capacitor 24 that is placed across the positive and negative terminals of each respective battery 10 in parallel electrical connection with the power leads 20 of a respective BCM. The capacitor provides for the passage of radio frequency signals across a battery in the event of an open circuit. Without the use of such capacitors 24, an open circuit in a battery within the battery pack could cut off radio frequency transmission between the control unit and those BCMs downstream from the open circuit. It is to be understood that each capacitor 24 is disposed within a respective BCM, and is illustrated in FIG. 1 as being outside of each BCM only for purposes of reference and illustration.

An EMS constructed according to principles of this invention also includes means for protecting the control unit 22 from high-voltage differentials between the main conductor 16 and the control unit, and for filtering out signals other than the radio frequency signals transmitted by the BCMs. In one embodiment, such means is a capacitor 26 connected in line between the control unit 22 and the main conductor 16. The capacitor serves primarily to isolate the control unit 22 from any high-voltage differentials that may develop. The capacitor 26 also has high-pass filter characteristics to enable the passage of radio frequency signals to and from the control unit. The lower cutoff frequency of the high-pass filter is determined by the values of frequencies being used for radio frequency communication, and is set at approximately 30 kilohertz in this embodiment.

An EMS constructed according to principles of this invention also includes means for preventing passage of high-frequency signals from other electrical devices connected to the electrical system by the main conductor 16, and for preventing the leakage of radio frequency signals from the EMS to the power handling desire or motor controller. Such means are used to ensure that the radio frequency signals generated by each BCM is transmitted to the control unit, and to ensure that each radio frequency control signal generated from the control unit to each BCM, free from high-frequency interference or signal leakage. In one embodiment, such means are used to eliminate the passage of high-frequency signals generated by the motor controller 12 to the main conductor 16, and to prevent the passage of the radio frequency signals from the main conductor to the motor controller. In a preferred embodiment, the means for preventing the passage of high-frequency signals from the motor controller, and for eliminating radio frequency leakage by the motor controller, includes isolation bands 28 that are made from a signal filtering material. The bands 28 are each placed around the main conductor 16 adjacent each connection point to the motor controller 12.

In a preferred embodiment, the bands 28 are made from ferrite beads, which are designed to filter out or prevent the passage of high-frequency signals above about 100 Kilohertz from the motor controller 12 into the main conductor 16. The ferrite beads also prevent transmission of the EMS radio frequency signal into the motor controller to eliminate signal leakage.

Referring still to FIG. 1, the electrical system of the electrically powered device or vehicle includes a battery charger 29. The EMS is illustrated as being adapted for connection with a battery charger 29. In one embodiment, the battery charger 29 can be disposed on board the electric vehicle and include DC power leads 30 that are electrically connected to the battery pack via the main conductor 16. Bands 28, identical to those discussed above, are placed around the leads 30 adjacent each connection point to the charger 29 for the same purposes previously discussed. The charger 29 includes a power lead 31 that is adapted to facilitate connection with an external AC power source. In certain embodiments, the control unit 22 is manufactured as part of the battery charger 29.

In an alternative embodiment, the battery charger 29 is disposed off board of the electric vehicle, and includes DC power leads 30 that are adapted to facilitate temporary electrical connection with the main conductor 16 when charging the battery pack. The temporary electrical connection can be made by using conventional attachment techniques such as by using releasible hard wire-type connections, inductive coupling and the like. Like the on-board charger embodiment, bands 28 are placed around the power leads 30 adjacent the connect point to the off-board charger. The off-board charger can be part of a battery pack charging system maintained at a vehicle repair facility, at a public or private parking garage and the like.

The EMS includes a second control unit 33 located off board of the vehicle. The second control unit or off-board control unit is attached to a lead 30 of the on-board or off-board charger 29. The off-board control unit 33 is configured in the same manner as the control unit 22 described above and below, to communicate with the on-board control unit 22 and/or the BCMs by radio frequency transmission via wired, radio, or inductive signal coupling. Specifically, the off-board control unit 33 serves to monitor battery operating parameters and control one or more BCM to regulate the operation of one or more battery, or battery cell, when charging the battery pack. Additionally, as described in better detail below, the off-board control unit is used to retrieve battery operating performance information, stored in the on-board control unit 22, during charging or during other type of battery pack servicing or maintenance. A capacitor 35, identical to the capacitor 26 discussed above, is placed in line between a radio frequency transmission line from the off-board controller and the lead 30.

The off-board control unit 33 is adapted to accommodate connection with a user interface 37 to facilitate programming the on-board control unit and accessing information stored in the on-board control unit. In certain embodiments, the off-board control unit is manufactured as being part of the off-board charger, and is programmed to receive downloaded battery performance information from BCMs or the control unit and regulate battery operating parameters during battery pack charging.

Figure 2:
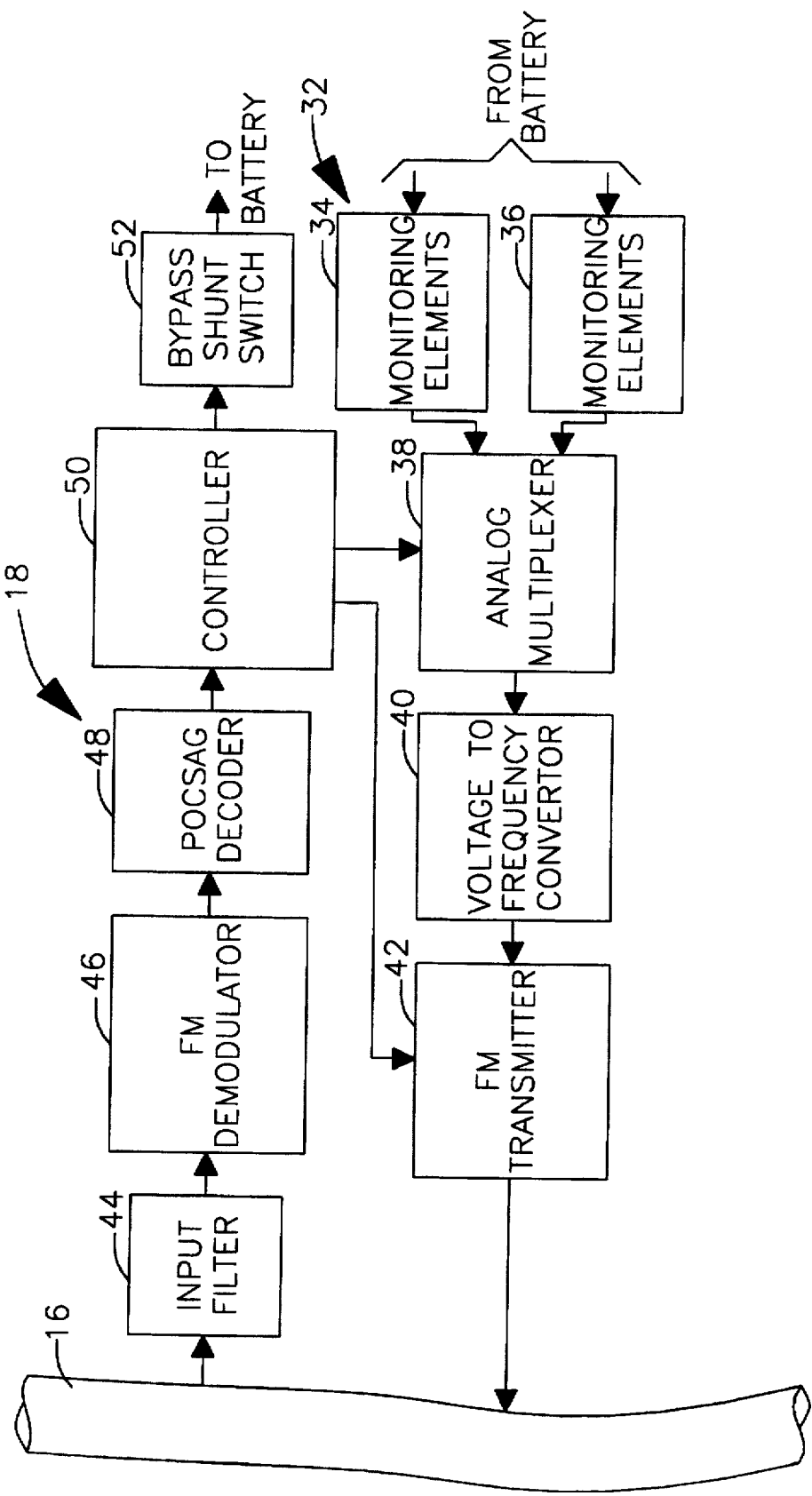
FIG. 2 is a schematic diagram of a battery monitoring module illustrated in FIG. 1.

Referring now to FIG. 2, each BCM 18 includes monitoring element(s) or sensor(s) 32 that are configured to measure or monitor a designated power source or battery operating parameter. In one embodiment, each BCM 18 includes two monitoring elements 34 and 36 for measuring the voltage and temperature of a respective battery. Each monitoring element 32 is configured to operate on 12 volt DC power and provide an analog signal output in the range of from about zero to five volts DC. In an embodiment where a BCM includes more than one monitoring element 32, an analog multiplexer 38 is provided that is configured to accommodate the analog signal outputs from each monitoring element, e.g., the voltage monitoring element 34 and the temperature monitoring element 36. A preferred analog multiplexer 38 is a single pole double throw type switch. Operation of the multiplexer 38 is controlled by a controller in the BCM, discussed in greater detail below.

Each BCM 18 includes a voltage to frequency convertor 40, which is configured to receive an input analog signal from the analog multiplexer 38 and convert the analog signal to a digital signal that is configured as a particular series of voltage pulses and the like. In one embodiment, the convertor 40 is configured to receive an input analog signal of from zero to five volts DC and convert the input signal to a pulsed signal of either no output (also referred to as logic 0)

or an output of about five volts (also referred to as logic 1), wherein the voltage information is encoded as the frequency of a pulse train.

Each BCM 18 includes a radio frequency (RF) transmitter 42 that is configured to modulate the pulsed signal output from the convertor 40. The radio frequency transmitter 42 can be a broadband transmitter, such as an frequency shift keying (FSK) transmitter. An output from the RF transmitter 42 is connected to the main conductor 16 so that the radio frequency signal is transmitted via the main conductor 16 to the control unit 22. In one embodiment, the RF transmitter is configured to transmit a broadband radio frequency signal of approximately 5.5 megahertz. Operation of each RF transmitter is controlled by a timer circuit in a controller of the respective BCM.

Each BCM 18 includes means for eliminating the passage of high-frequency signals outside of the range of radio frequency signals transmitted by the EMS. In one embodiment, such means is in the form of an input filter 44 is connected in line between the main conductor 16 and an RF demodulator in the BCM. In one embodiment, the input filter 44 that is configured as a 4.5 megahertz bandpass filter to prohibit the passage of radio frequency signals above or below approximately 4.5 megahertz and, is configured as a common-mode rejection filter to thereby reduce or eliminate possible signal interference.

A radio frequency signal sent from the control unit 22, via the main conductor 16, is transmitted to each BCM at a broadband radio frequency of approximately 4.5 megahertz, depending on the particular digital control signal. Each radio frequency control signal transmitted by the control unit is made up of an address string to one or more BCM, and a particular command string. Each BCM 18 includes an RF demodulator 46 and the like that is configured to receive a radio frequency control signal transmitted from the control unit 22 and demodulate it to a digital signal. In one embodiment, the RF demodulator 46 is capable of receiving the broadband radio frequency control signal of 4.5 megahertz and converting it to a digital signal zero or five volts.

Each BCM 18 includes means for decoding the digital control signal that is received from the RF demodulator 46. In one embodiment, the decoding means is a post office code standardization advisory group (POCSAG) decoder, which is also known as a consultative committee international radio (CCIR) paging code No. 1. The POCSAG decoder 48 is capable of identifying whether the digital control signal, i.e., the addressed command string, that is received is addressed to one or more particular BCM 18. If a correctly addressed code is recognized, the POCSAG decoder transfers the remaining portion of the signal, i.e., the command string, to a controller 50. If an incorrectly addressed code is received by the POCSAG decoder, the remaining command string is not passed on to the controller 50. As mentioned above, each BCM 18 can be configured to recognize one or more address code so that groups of more than one BCM can be controlled simultaneously if desired.

In one embodiment, the controller 50 is configured to accept the input digital control signal, i.e., the command string, and to identify whether it matches a predetermined command. In a preferred embodiment, the controller 50 performs simple pattern matching to determine whether or not the command string corresponds to one of the following six predetermined commands: (1) shunt and transmit voltage; (2) shunt and transmit temperature; (3) shunt and do not transmit; (4) transmit temperature; (5) transmit voltage; and (6) do not shunt and do not transmit. Once the controller 50 has identified a particular command string, it outputs a control signal to activate a particular device. In one embodiment, the control signal may be sent to activate one or more device(s) comprising the RF transmitter 42, the analog multiplexer 38, and one or more control device(s), discussed below. The controller 50 can also be programmed to cause the battery control module to perform battery monitoring and controlling functions in response to internal criteria, rather than in response to control signals from the control unit 22.

As shown in FIG. 2, an output from the controller 50 is connected to the RF transmitter 42, to operate the transmitter in response to a particular command string received from the control unit 22, such as commands 1–2 and 4–5 above. The output from the controller 50 is also connected to the analog multiplexer 38, to switch between the voltage and temperature monitoring elements 34 and 36 in response to a particular command received from the control unit 22, such as 1–2 and 4–5 above.

The output from the controller 50 can also be connected to one or more control element or device to effect some change in one or more operating parameter(s) of the respective battery or battery cell monitored by the BCM 18. In one embodiment, the control device is a bypass shunt switch (BSS) 52. The BSS 52 is positioned across the terminals of the respective battery and may be configured to discharge a respective battery within the battery pack through a shunt resister. In a preferred embodiment, the BSS 52 is configured to discharge a respective battery upon activation by the controller in response to a command received from the control unit, such as commands 1–3. The BSS does this by drawing current away from the battery using one or more resistors and the like. Activating the BSS in one or more BCM to discharge one or more batteries in a battery pack may be desired, for example, to control the voltage output of each individual battery in the battery pack to achieve battery equalization, or to protect a battery from harmful effects of overcharging.

Figure 3:
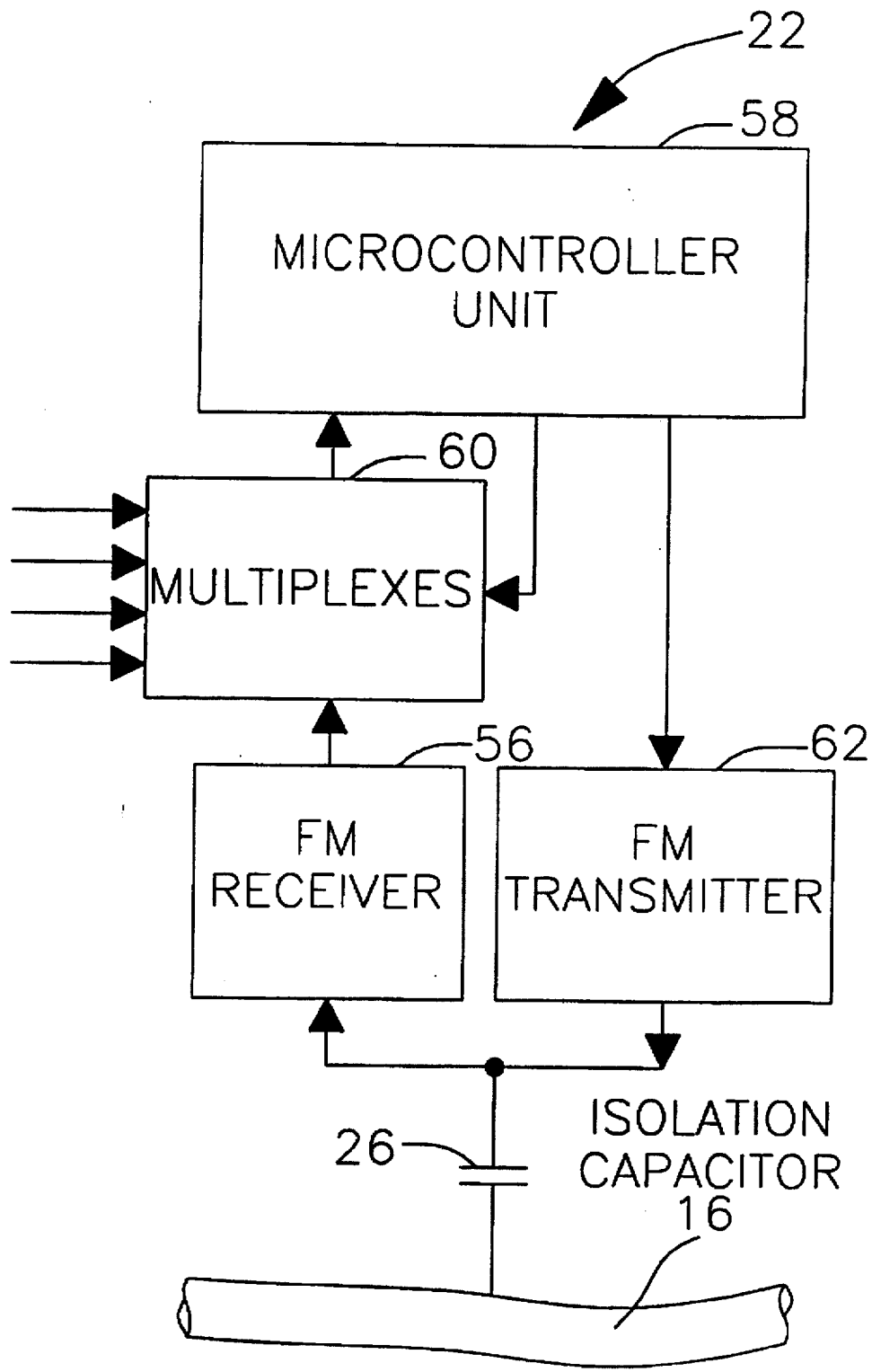
FIG. 3 is a schematic diagram of a control unit illustrated in FIG. 1.

Referring now to FIG. 3, the EMS control unit 22 includes an RF receiver 56 having an input connected to the main conductor 16, via the in-line capacitor 26, as shown in FIG. 1. The RF receiver 56 is a broadband receiver configured to receive the broadband radio frequency signal transmitted by the RF transmitters of each of the BCMs. In one embodiment, the RF receiver 56 is configured to receive a broadband radio frequency signal of approximately 5.5 megahertz. The RF receiver 56 also demodulates the received radio frequency signal into a digital voltage signal, for example, in one embodiment from zero to five volts DC.

Output from the RF receiver 56 may either be connected directly to a microcontroller unit 58, or may alternatively be connected to the microcontroller unit 58 via a digital multiplexer 60 or other digital switch. The multiplexer 60 is operated by the microcontroller unit 58 to select from one of a number of different input signals to be processed by the microprocessor unit. In one embodiment, a multiplexer 60 is used to select between an output signal from the RF receiver 56 and input signals from other electrical devices within the vehicle, e.g., input signals from the motor controller to provide voltage, current, temperature, and charging status information.

The microcontroller unit 58 is configured to operate off of available power, such as 12 volts DC when used in an electric vehicle, and includes a microprocessor board (not shown). Alternatively, the microcontroller unit can operate from an internal source of power, from vehicle power external from the battery pack, from solar power and the like. The microprocessor board is configured to accommodate a number of different input signals that include the digital voltage signal output from the RF receiver 56. The microprocessor board is programmed to receive the signal output from the RF receiver, and additionally store the received information in a SRAM or EEPROM. The control unit 22 is adapted to accommodate connection with a user interface to facilitate programming the microprocessor board and to gain access to information stored in the microprocessor SRAM. Information stored in the microcontroller unit 58 can be retrieved at a later time for purposes of diagnostic evaluation and the like. Such stored information includes the performance history of each battery in a battery pack, or each battery cell of batteries in a battery pack, over the service life of the battery or battery pack, or within the servicing interval of the same. In certain embodiments of the invention, such battery performance history is retrieved by the off-board control unit 33 during vehicle maintenance or battery pack servicing to provide important information that may indicate the mechanism or reason for a particular battery-related failure.

The signal output received from the RF receiver 56, i.e., battery operating parameter information transmitted by each BCM, is evaluated by the microprocessor according to one or more control system programs. In various embodiments, the microprocessor uses control, pattern recognition, artificial intelligence, fuzzy logic, neural network, or other analysis and control techniques to interpret the information received from each of the BCMs and/or generate a control response. Once the received information is evaluated, the microprocessor effects one or more process steps that include generating one or more particular command.

In a preferred embodiment, the microprocessor unit 58 generates one or more of the six commands discussed above. Each command is configured in the form of a serial digital control signal comprising series of zero or five volt bits. Each command string is accompanied by one or more address, configured as an additional series digital signal that corresponds with one or more address of a particular BCM. In this manner the control unit 22 is able to transmit control signals to one or more particular BCM. Although a particular method of tagging or addressing the command string to one or more designated BCM has been specifically disclosed, it is to be understood that other techniques of tagging or addressing the command string can be used, such as by analog tagging techniques, other digital tagging techniques, or by using multiple channels of radio frequency signals.

The output signal from the microcontroller unit 22, i.e., the addressed command pulse signal, is routed to an RF transmitter 62. The RF transmitter 62 is preferably a broadband transmitter similar to the RF transmitters in each BCM. The RF transmitter 62 takes the serial digital signal and transmits a broadband radio frequency signal of approximately 4.5 megahertz, depending on whether a signal of one or zero is received, respectively. An output from the RF transmitter 62 is connected to the main conductor 16 via the in-line capacitor 26.

In addition to providing a control signal to each of the BCMs, the microprocessor unit 22 is also configured to perform other functions such as: (1) monitoring a current state of charge for the battery pack and transmitting the same to a fuel gauge indicator; (2) controlling the operation of a ventilation fan in a battery compartment of the vehicle; (3) controlling the operation of auxiliary electrical devices, e.g., passenger compartment heating and cooling functions, to reduce the power routed to such devices or load shed when conditions call for battery conservation; and (4) activating a maintenance warning light to indicate when one or more battery or battery cells within a battery pack need replacement or servicing.

In a preferred embodiment, an EMS constructed according to principles of this invention operates to monitor the performance of individual batteries in a battery pack, or individual battery cells in batteries making up a battery pack, to achieve battery charge equalization. Battery charge equalization refers to controlling the state of charge of each battery in a battery pack so that each individual battery is charged to the same degree as other batteries in the pack. For example, if one battery in a battery pack is relatively weaker than the remaining batteries, the weak battery will be selectively charged for a longer period or more frequently than the other batteries so that it does not have the effect of weakening the overall performance of the pack. As another example, if one battery in a battery pack is relatively stronger than the remaining batteries, the strong battery will be selectively discharged so that it does not have the effect of reducing the charging time or frequency for the remaining batteries. Battery charge equalization, therefore, improves battery pack service life because each battery in the battery pack is monitored and controlled individually to perform equally.

EMSs constructed according to this invention have several advantages when compared to existing wired-type systems. One advantage is the reduced material cost of the EMS system due to the elimination of extra wires, wiring harnesses, and installation associated with such wires. Another advantage is that the use of the EMS eliminates the need for high-voltage isolation components, needed to monitor and control signals with widely differing base voltages. Another advantage is the weight savings realized by the EMS due to the elimination of extra wires, wiring harnesses, and high-voltage isolation components. Another advantage is that the EMS is safe to install because it does not include any components or modules that are connected with voltages greater than 12 volts DC. Another advantage is that the EMS is more reliable and has a potentially longer service life than wired-type systems because it lacks the most vulnerable element of those systems; namely, exposed signal wires near the battery.

Still another advantage of EMSs of this invention is the modular design of components, which allows for extremely flexible and robust system operation. For example, single failures in one BCM or an open circuit in a battery do not disable the entire system because other BCMs are still able to transmit information to and receive control signals from the control unit via radio frequency transmission. The modular construction also facilitates easy removal of an improperly operating or nonfunctioning BCM from the system as well as replacement with a repaired, new or upgraded BCM. Further, modular construction facilitates the introduction of additional BCMs or other system modules into the system by simply reprogramming or instructing the control unit.

The modular construction of the EMS allows for the installation of system components inside of existing electrical system components, e.g., the installation of a BCM within a battery housing, thereby allowing them to be made by the manufacturers of such electrical system components. For example, the control unit can be manufactured into the motor controller or into an on-board battery charger. Incorporating the EMS components into existing electrical system components is advantageous because it could further reduce the cost of the EMS, increase the reliability of the EMS, reduce the space requirements for the EMS, increase EMS flexibility, and allow the EMS to cooperate directly with the motor control or battery charger.

Although a specific embodiment of the EMS has been described and illustrated herein, many modifications and variations will be apparent to those skilled in the art. For example, an EMS within the scope of this invention comprises means for facilitating the transfer of radio frequency transmissions to and from the control unit and each BCM by other than by conductive radio frequency transmission via the main conductive path, e.g., the main conductor, in an electrical system, such as by nonconductive methods, e.g., an antenna system, remote from the main conductor. As another example, the EMS can use radio frequencies other than those specifically described above for purposes of transmitting information from the BCMs and control signals from the control unit. Additionally, the information and control signals generated by the EMS can be transmitted, via radio frequency, using analog rather than digital transmission methods.

Accordingly, it is to be understood that within the scope of the appended claims the EMS according to principles of this invention may be embodied other than as specifically described herein.

What is claimed is:

1. An energy management system for use with an electrically powered apparatus, the system comprising:
   a number of battery control modules on the apparatus, wherein each battery control module includes:
     means for monitoring an operating parameter of an electric power source for the apparatus selected from the group consisting of a battery pack, at least one battery in a battery pack, at least one cell in a battery, and combinations thereof;
     means for receiving a radio frequency signal;
     means for transmitting a radio frequency signal; and
   a control unit on the apparatus configured to monitor and control the battery control modules by radio frequency signal, wherein the control unit includes:
     means for receiving a radio frequency signal transmitted from each battery control module; and
     means for transmitting a radio frequency control signal to each battery control module;
   wherein the receiving and transmitting means for the control unit and each battery control module is connected to a common conductive transmission medium disposed between the electric power source and a power handling device in the electrically powered apparatus.

2. An energy management system as recited in claim 1 wherein the control unit further comprises means for evaluating radio frequency signals transmitted by each battery control module and providing a control signal to transmit to at least one designated battery control module.

3. An energy management system as recited in claim 1 wherein the control unit further comprises means for addressing the control signal to one or more designated battery control module.

4. An energy management system as recited in claim 3 wherein each battery control module further comprises means for recognizing whether a control signal is addressed to that particular battery control module.

5. An energy management system as recited in claim 1 wherein the means for transmitting radio frequency signals for each battery control module and the control unit is a radio frequency transmitter, and wherein the radio frequency transmitter in each battery control module is configured to transmit a radio frequency different from that of the radio frequency transmitter in the control unit.

6. An energy management system as recited in claim 5 wherein the means for receiving radio frequency signals for each battery control module and the control unit is a radio frequency receiver, wherein the radio frequency receiver in each battery control module is configured to receive radio frequency control signals transmitted from the control unit, and wherein the radio frequency receiver in the control unit is configured to receive radio frequency signals from each battery control module.

7. An energy management system as recited in claim 1 wherein each battery control module comprises a battery voltage monitoring element and a battery temperature monitoring element, each attached to the electric power source.

8. An energy management system as recited in claim 1 wherein each battery control module is configured to transmit energy source operating parameter information in response to a designated control signal.

9. An energy management system as recited in claim 1 wherein each battery control module further comprises means for controlling at least one energy source operating parameter that is activated in response to a designated control signal.

10. An energy management system as recited in claim 1 further comprising means for isolating the radio frequency signals transmitted and received by each battery control module and the control module from other electrical devices in the electrically power apparatus.

11. An energy management system as recited in claim 1 further comprising a second control unit located off of the electrically powered apparatus, wherein the second control unit includes means for receiving radio frequency signals from the control unit and the battery control modules, and means for transmitting radio frequency control signals to the control unit and battery control modules.

12. An energy management system as recited in claim 1 wherein the second control unit is adapted to accommodate attachment with a user interface.

13. An energy management system as recited in claim 1 wherein the control unit includes means for storing electric power source operating parameter information transmitted by each battery control module.

14. An energy management system for use with an electric vehicle having a battery source of motive power, the system comprising:
   a number of battery control modules, wherein each battery control module includes:
     at least one monitoring element located on the vehicle and configured to measure an operating parameter of an electric power source selected from the group consisting of a battery pack, at least one battery in a battery pack, at least one cell in a battery, and combinations thereof;
     a radio frequency receiver;
     a radio frequency transmitter; and
   a control unit located on the vehicle and configured to monitor and control the battery control modules by radio frequency signal, wherein the control unit includes:
     a radio frequency receiver configured to receive a radio frequency signal transmitted from the radio frequency transmitter in each battery control module;
     a radio frequency transmitter configured to transmit a radio frequency signal that is capable of being received by the radio frequency receiver in each battery control module;

means for evaluating radio frequency signals received from each battery control module and providing a control signal to transmit to at least one designated battery control module;

wherein the radio frequency receiver and transmitter for the control unit and each battery_ control module is connected to a common conductive .path attached between the electric power source and a power handling device in the vehicle.

15. An energy management system as recited in claim 14 wherein the control unit includes means for addressing the control signal to be recognized by at least one designated battery control module.

16. An energy management system as recited in claim 15 wherein each battery control module includes means for recognizing whether a control signal is addressed to that particular battery control module.

17. An energy management system as recited in claim 14 further comprising means for isolating the radio frequency signals transmitted and received by each battery control module and the control module via the conductive path from other devices in the vehicle.

18. An energy management system as recited in claim 14 further comprising means disposed between the conductive path and the control unit to isolate the control unit from high-voltage differentials between the conductive path and the control unit.

19. An energy management system as recited in claim 14 wherein each battery control module includes a battery voltage monitoring element and a battery temperature monitoring element.

20. An energy management system as recited in claim 14 wherein each battery control module is configured to transmit energy source operating parameter information in response to a designated control signal.

21. An energy management system as recited in claim 20 wherein each battery control module further comprises means for effecting a change in at least one energy source operating parameter in response to a designated control signal.

22. An energy management system as recited in claim 14 further comprising means for isolating the radio frequency signals transmitted and received by each battery control module and the control module from other electrical devices in the electrically powered apparatus.

23. An energy management system as recited in claim 14 further comprising a second control unit located off of the vehicle, wherein the second control unit includes a radio frequency transmitter and a radio frequency receiver configured to accommodate communication with the control unit and each battery control module.

24. An energy management system as recited in claim 23 wherein the second control unit is adapted to accommodate connection with a user interface.

25. An energy management system as recited in claim 14 wherein the control unit includes means for storing (battery) energy source operating parameter information transmitted by each battery control module.

26. An energy management system for use with an electric vehicle having a battery source of motive power, the energy management system comprising:

a number of battery control modules located on the vehicle, wherein each battery control module is configured to transmit energy source operating parameter information by radio frequency signal in response to a radio frequency control signal, and wherein each battery control module includes:

at least one monitoring element for measuring an operating parameter of a respective battery or a battery cell;

a radio frequency transmitter for transmitting operating parameters measured by each monitoring element of the battery control module;

a radio frequency receiver for receiving a control signal; and a control unit located on the electric powered apparatus for monitoring and controlling the battery control modules by radio frequency signal, wherein the control unit includes:

a radio frequency receiver adapted to receive a transmitted signal from each battery control module;

a controller for evaluating the radio frequency signal transmitted from each battery control module and providing a control signal;

means for addressing the control signal to be recognized by one or more designated battery control module; and a radio frequency transmitter for transmitting the radio frequency control signal to each battery control module;

wherein the radio frequency receiver and transmitter for the control unit and each battery control module is connected to a common main conductive path in an electrical system of the vehicle running between batteries in a battery pack and connecting the battery pack to a power handling device in the vehicle.

27. An energy management system as recited in claim 26 further comprising a second control unit located off of the vehicle, the second control unit including:

a radio frequency receiver configured to receive radio frequency signals from each battery control module and the control unit;

a controller for evaluating the signal transmitted from each battery control module the control unit and providing a control signal; and a radio frequency transmitter configured to transmit the control signal to the control unit and the battery control modules.

28. An energy management system as recited in claim 27 wherein the second control unit is adapted to accommodate connection with a user interface.

29. An energy management system as recited in claim 26 wherein each battery control module includes means for effecting a change in an energy source operating parameter in response to a designated control signal.

30. An energy management system as recited in claim 26 wherein each battery control module includes means for evaluating whether the control signal is addressed to that particular battery control module.

31. An energy management system as recited in claim 26 further comprising means for isolating radio frequency signals transmitted and received by the battery control modules and the control unit from other electrical devices connected to the main conductive path.

32. An energy management system as recited in claim 26 further comprising means disposed between the main conductive path the control unit for isolating the control unit from high-voltage differentials between the conductive path and the control unit.

33. An energy management system for use with an electric vehicle having a battery source of motive power, the system comprising:

a number of battery control modules for monitoring and controlling at least one operating parameter of batteries in a battery pack, wherein each battery control module is located on the vehicle and includes:
- at least one monitoring element for monitoring an operating parameter of the battery;
- a radio frequency transmitter, wherein the radio frequency transmitter is configured to transmit battery operating parameter information in response to a radio frequency control signal;
- a radio frequency receiver for receiving a radio frequency control signal;
- means for evaluating the radio frequency control signal to determine if the control signal is addressed to that particular battery control module; and
- a control element for effecting a change of at least one operating parameter of the battery in response to a designated radio frequency control signal;

a control unit for evaluating battery operating parameter information transmitted by radio frequency from each battery control module and producing a designated radio frequency control signal to control the battery control modules, wherein the control unit includes:
- a radio frequency receiver configured to receive radio frequency signals transmitted by each battery control module;
- means for evaluating information received from each battery control module and for producing a designated radio frequency control signal;
- means for addressing the radio frequency control signal to be recognized by one or more designated battery control module; and
- a radio frequency transmitter for transmitting the control signal to the battery control modules; and a main conductive path in an electrical system of the vehicle connecting the batteries in the battery pack to a power handling device in the vehicle, wherein the radio frequency receiver and transmitter for the control unit and each battery control module are connected to the main conductive path for transmitting radio frequency signals therebetween.

34. An energy management system as recited in claim 33 wherein each battery control module includes a battery voltage monitoring element and a battery temperature monitoring element.

35. An energy management system as recited in claim 33 wherein the control element is a switch adapted to discharge a respective battery through a shunt resister in response to a designated control signal.

36. An energy management system as recited in claim 33 further comprising means disposed between the main conductive path and the control unit for isolating the control unit from high-voltage differentials between the main conductive path and the control unit.

37. An energy management system as recited in claim 33 further comprising means disposed between the main conductive path and other electrical devices in the electric vehicle for isolating the radio frequency signals of the energy management system such other devices.

38. An energy management system as recited in claim 33 further comprising a second control unit located off of the vehicle, wherein the second control unit includes a radio frequency transmitter and a radio frequency receiver configured to accommodate communication with the control unit and each battery control module.

39. An energy management system as recited in claim 38 wherein the second control unit is adapted to accommodate connection with a user interface.

40. An energy management system as recited in claim 33 wherein the control unit includes means for storing battery operating parameter information transmitted by each battery control module.

41. An energy management system as recited in claim 39 wherein the second control unit is manufactured as part of a battery charger located off of the vehicle.

42. An energy management system as recited in claim 33 wherein the control unit is manufactured as part of a battery charger located on the vehicle.

43. An energy management system as recited in claim 33 wherein the control unit is manufactured as part of a motor controller on the vehicle.

44. An energy management system as recited in claim 33 wherein each battery control module is manufactured as part of battery source of motive power.

* * * * *